United States Patent
Smith et al.

(10) Patent No.: US 7,460,516 B1
(45) Date of Patent: Dec. 2, 2008

(54) SYSTEM AND METHOD FOR COMPRESSING COMMUNICATION FLOWS IN A NETWORK ENVIRONMENT

(75) Inventors: Malcolm M. Smith, Calgary (CA); Tmima Koren, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 10/630,318

(22) Filed: Jul. 30, 2003

(51) Int. Cl.
*H04J 3/24* (2006.01)

(52) U.S. Cl. ................ 370/349; 370/469; 370/352; 370/389; 455/418; 455/419

(58) Field of Classification Search ........... 455/418, 455/557, 419; 370/349, 474, 477, 473, 469, 370/352
See application file for complete search history.

(56) References Cited

U.S. PATENT DOCUMENTS

| | | | | |
|---|---|---|---|---|
| 5,483,556 A * | 1/1996 | Pillan et al. | ................. | 375/340 |
| 5,894,557 A | 4/1999 | Bade et al. | ............. | 395/200.58 |
| 6,134,245 A * | 10/2000 | Scarmalis | ................... | 370/474 |
| 6,192,051 B1 | 2/2001 | Lipman et al. | ............... | 370/389 |
| 6,363,065 B1 | 3/2002 | Thornton et al. | ............ | 370/352 |
| 6,400,722 B1 | 6/2002 | Chuah et al. | ................. | 370/401 |
| 6,477,595 B1 | 11/2002 | Cohen et al. | ................. | 710/105 |
| 6,512,754 B2 * | 1/2003 | Feder et al. | .................. | 370/338 |
| 6,512,773 B1 | 1/2003 | Scott | ..................... | 370/395.61 |
| 6,804,237 B1 * | 10/2004 | Luo et al. | .................... | 370/392 |
| 7,136,377 B1 * | 11/2006 | Tweedly et al. | ............. | 370/356 |
| 2002/0143856 A1 * | 10/2002 | Sastri et al. | ................. | 709/202 |
| 2002/0146000 A1 * | 10/2002 | Jonsson et al. | ............. | 370/352 |
| 2003/0185230 A1 * | 10/2003 | Fisher et al. | ................. | 370/464 |
| 2004/0114623 A1 * | 6/2004 | Smith | .......................... | 370/466 |

* cited by examiner

*Primary Examiner*—Vincent P. Harper
*Assistant Examiner*—Khai M Nguyen
(74) *Attorney, Agent, or Firm*—Baker Botts L.L.P.

(57) ABSTRACT

A method for compressing data is provided that includes receiving a packet communicated by a mobile station and extracting a high-level data link control (HDLC) payload from the packet. A compression operation may then be performed on the HDLC payload in order to reduce a number of bytes associated with the packet. A key may be built that maps the HDLC payload associated with the packet to the key, the key being broken into segments that are positioned into a selected one or more of a source internet protocol (IP) address field, a user datagram protocol (UDP) source port field, and a UDP destination port field of a UDP packet. Remaining fields of the HDLC payload may be copied and positioned into a payload field of the UDP packet. The UDP packet may then be communicated to a routing functionality such that it may be directed to a next destination.

21 Claims, 3 Drawing Sheets

SYSTEM AND METHOD FOR COMPRESSING COMMUNICATION FLOWS IN A NETWORK ENVIRONMENT

TECHNICAL FIELD OF THE INVENTION

The present invention relates in general to the field of network communications and, more particularly, to a system and method for compressing communication flows in a network environment.

BACKGROUND OF THE INVENTION

Communication systems and architecture have become increasingly important in today's society. One aspect of communications relates to maximizing bandwidth and minimizing delays associated with data and information exchanges. Some radio access network (RAN) products may focus on the transport of traffic from the cell site, where the base transceiver station is located, to the central office (CO) site, where the base station controller is located. These RAN products implement inadequate compression techniques, as significant delays are generally incurred and bandwidth savings may not be realized. Such products may also be inflexible in targeting (or operating effectively with) certain types of data propagating along particular communication links. Other types of data are simply not accounted for, whereby network components are unable to process the communication flows.

Additionally, most proposed solutions for effectuating proper data and information exchanges add significant overhead and cost in order to be as efficient as possible. For example, T1/E1 lines are generally expensive and, thus, should be maximized in order to achieve optimal system performance. Accordingly, the ability to provide a communications system that consumes few resources, accommodates diverse communication flows, and achieves minimal delay presents a significant challenge for network designers and system administrators.

SUMMARY OF THE INVENTION

From the foregoing, it may be appreciated by those skilled in the art that a need has arisen for an improved compression approach that optimizes data exchanges in a communications environment. In accordance with one embodiment of the present invention, a system and method for compressing communication flows in a network environment are provided that substantially eliminate or greatly reduce disadvantages and problems associated with convention compression techniques.

According to one embodiment of the present invention, there is provided a system for compressing data that includes receiving a packet communicated by a mobile station and extracting a high-level data link control (HDLC) payload from the packet. A compression operation may then be performed on the HDLC payload in order to reduce a number of bytes associated with the packet. A key may be built that maps the HDLC payload associated with the packet to the key, the key being broken into segments that are positioned into a selected one or more of a source internet protocol (IP) address field, a user datagram protocol (UDP) source port field, and a UDP destination port field of a UDP packet. Remaining fields of the HDLC payload may be copied and positioned into a payload field of the UDP packet. The UDP packet may then be communicated to a routing functionality such that it may be directed to a next destination.

Certain embodiments of the present invention may provide a number of technical advantages. For example, according to one embodiment of the present invention, a communications approach is provided that significantly enhances adaptability and bandwidth parameters for a given architecture. This is a result of a compression technique that allows for the integration of multiple protocols at both the cell site router and aggregation node within the network. Thus, both of these elements may accommodate diverse communication flows, without having to significantly alter one or more formats of the flows. This further allows a base transceiver station and a base station controller to efficiently operate in conjunction with multiple communication protocols without having to be significantly modified or substantially reconfigured.

Another technical advantage associated with one embodiment of the present invention relates to its flexibility. The compression approach provided may be leveraged in order to cooperate with other features of the internet protocol (IP) architecture. For example, the compression approach offered by the present invention may be used in cooperation with quality of service, routing, priority, and security characteristics. This allows two systems to be integrated such that the benefits of one system can be realized and delivered to an end user without a significant overhaul in the corresponding network architecture. This may save considerable time and effort on the part of any network designer or system operator, as two communication protocols are suitably accommodated in the network. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
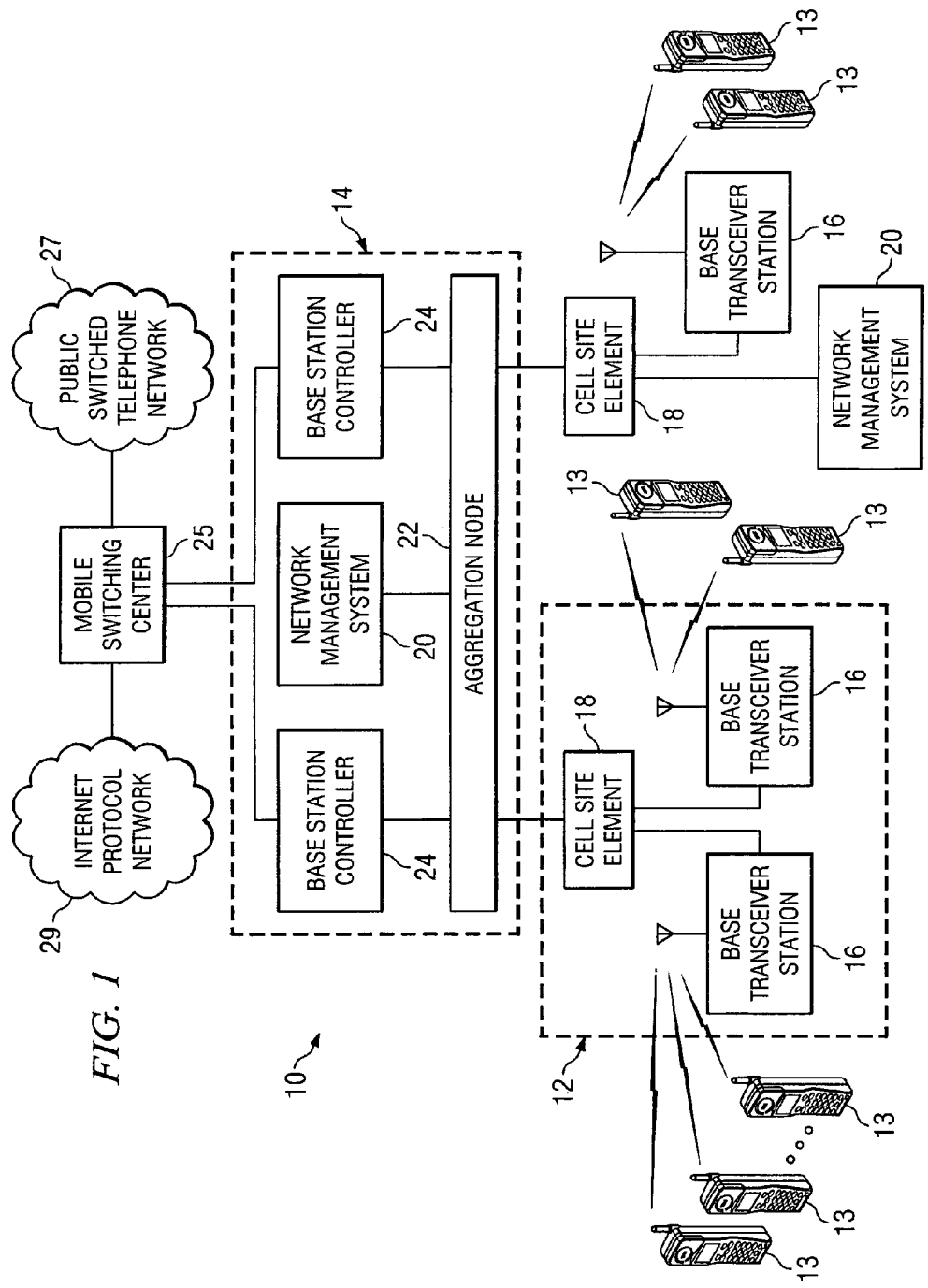
FIG. 1 is a simplified block diagram of a communication system for compressing data.

FIG. 1 is a simplified block diagram of a communication system 10 for compressing data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement (e.g. first generation, 2G, etc.) that provides a communicative platform for communication system 10. For example, the present invention may be used in conjunction with a 3G network, where 3G equivalent networking equipment is provided in the architecture. Communication system 10 is versatile in that it may be used in a host of communications environment such as in conjunction with any code-division or time-division multiple access (CDMA or TDMA) element or protocol for example, whereby signals from end users, subscriber units, or mobile stations 13 may be multiplexed over the time domain.

In accordance with the teachings of the present invention, a compression approach is provided that integrates diverse communication flows in a network. Communication system 10 provides an architecture in which cell site element 18 and/or aggregation node 22 implements compression protocols in order to leverage one or more existing technologies such that data exchanges (e.g. phone calls) may be effectively transmitted on backhaul lines. Bits may be taken that are associated with the calls and compressed in order to reduce the T1/E1 allocations or time slots being implemented for a given number of GSM phone calls on the backhaul. Communication system 10 may include two steps or parts in its operation. In a first step, an effective mapping may take place. In a second step, a compression technique may be applied to a given set of packet flows. Note that because of the similar characteristics in these two operations, the terms "compression" and "mapping" may be used interchangeably herein in this document where appropriate. In one general sense, the mapping operation performed by communication system 10 may be thought of as a sub-part of an overall compression scheme to be employed in a network environment. It is also worthy to note that other arbitrary terminology may be used in order to describe the operations identified above. For example, terms such as "extract," "separate," and "conversion" may be used to describe some of the various functionalities of communication system 10 in the context of performing such mapping or compression operations.

In order to leverage an existing IP radio access network (RAN) architecture, a high-level data link control multiplex (HDLCmux) protocol may be implemented in a way that leverages the existing compressed UDP (cUDP) and point to point protocol (PPP) multiplexing (PPPmux). In one embodiment, this leveraging is accomplished by converting each radio access bearer (RAB) flow from the base transceiver station/base station controller (BTS/BSC) (i.e. HDLC/base station communications network (BCN) flow) into a set of one or more UDP/IP flows. In executing this, the resulting UDP/IP flows can be compressed by an existing cUDP/PPPmux protocol stack of the IP-RAN. With this scheme, traffic frames from the HDLC-based interface are converted to UDP/IP packets by a mapping technique. The IP packets are then forwarded to the peer compression module on another IP router on the IP network. The peer compression module converts the UDP/IP packets back into traffic frames on the HDLC-based interface. Thus, a mapping function is defined between an HDLC/BCN frame and a UDP/IP packet. In a general sense, communication system 10 achieves an optimum integration/accommodation of communication flows with use of an effective conversion or mapping approach. Thus, HDLC compression (HDLCmux) may be realized by transporting HDLC over standard UDP/IP protocols and existing IP-RAN compression technology. Modifications to both cell site element 18 and aggregation node 22 may be executed in order to effectuate this goal. Additional details relating to cell site element 18 and aggregation node 22 are provided below with reference to FIG. 2.

The compression protocol implemented by communication system 10 may minimize delays associated with other conversion approaches and, additionally, reduce costs associated with T1/E1 lines that would otherwise be needed to facilitate additional data exchanges. Delays are effectively decreased as a result of cell site element 18 or aggregation node 22 being capable of accommodating multiple protocols in an optimal fashion. Communication system 10 also offers a communications approach that significantly enhances adaptability parameters for a given architecture. This is a result of a compression technique that allows for the integration of multiple protocols at both cell site element 18 and aggregation node 22 within the network. Thus, both of these elements may accommodate diverse communication flows, without having to significantly alter one or more formats of the flows. This further allows a base transceiver station and a base station controller to effectively operate in conjunction with multiple communication protocols without having to be significantly reconfigured.

The compression approach of communication system 10 may also be leveraged in order to cooperate with other features of an IP architecture. For example, the compression approach offered by communication system 10 may be used in cooperation with quality of service, routing, priority, security characteristics, and any other suitable parameters, services or functions. This further allows two systems to be integrated such that the benefits of one system can be realized and delivered to an end user without a significant overhaul in a corresponding network architecture. This may save considerable time and effort on the part of any network designer or system operator.

Mobile station 13 is an entity, such as a client, subscriber, end user, or customer that seeks to initiate a communication session or data exchange in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example or in wireless applications a microwave or satellite T-1) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver station 16. Some of the responsibilities of base station controllers 24 may include management of radio channels and assisting in handover scenarios.

In operation, layer one based (e.g. time division multiplexed (TDM), GSM, etc.) or layer two-based (e.g. Frame Relay, HDLC, asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the traffic that has a common destination. The multiplexed payloads, as well as any payloads extracted from the network management system IP or Ethernet traffic, may be communicated across a link to aggregation node 22 within central office site 14. Aggregation node 22 may demultiplex the payloads for delivery to an appropriate base station controller 24 or network management system 20. Note that network management system 20 could be any other suitable type of IP BTS element or access point (AP) where appropriate (e.g. IEEE 802.11, 802.16, 802.20, etc.) and in accordance with particular communication needs.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchange between mobile station 13 and any other suitable entity within or external to communication system 10.

IP network 29 is a series of points or nodes of interconnected communication paths for receiving and transmitting packets of information that propagate through communication system 10. Note that IP network 29 may be coupled to a PDSN positioned between BSC 24 and itself. IP network 29 offers a communications interface between mobile stations 13 and any other suitable network equipment. IP network 29 may be any local area network (LAN), metropolitan area network (MAN), wide area network (WAN), virtual private network (VPN), wireless local area network (WLAN), or any other appropriate architectural system that facilitates communications in a network environment. IP network 29 implements a transmission control protocol/internet protocol (TCP/IP) communication language protocol in a particular embodiment of the present invention. However, IP network 29 may alternatively implement any other suitable communications protocol for transmitting and receiving data packets within communication system 10.

In operation of an example embodiment, the compression technique of communication system 10 may free up as much mapping space as possible in the UDP/IP headers. One or more of the following assumptions may be made: 1) the IP network (and IP routers) support IP version four (IPv4) or IP version six (IPv6), or the IP network can tunnel IPv4 over Ipv6; 2) the IP network (and IP routers) between the compression module do not use source-based routing (i.e. the IP source address is not used in certain forwarding decisions); 3) the IP network (and IP routers) do not use layer four (UDP) filtering or port-based routing decisions; and 4) the compression modules are provisioned with the destination IP address for traffic that is received from a particular HDLC interface. This may effectively establish a tunnel between the BTS and BSC. With these simplifications, the following UDP/IP fields may be used by the mapping function: 1) IP source; 2) UDP source port; and 3) UDP destination port.

The mapping function may take a RAB flow (which in the case of a 2G CDMA system may be an HDLC/BCN flow) and convert it into multiple UDP/IP flows. The UDP/IP fields may be derived as follows: IP source:=FLOW+(COS<<24)+ (PT<<28) UDP src port:=ADDR+(CTRL<<8). The remaining IP/UDP header fields may be set to reasonable values for the IP environment (e.g. TOD/DSCP field set to EF). The HDLC flag and CRC fields may be discarded (and subsequently mapped back), while the remaining HDLC header fields (SEQ and MISC) may be pre-pended to the payload field, which together form the UDP data (payload) field. The resulting UDP/IP packet may be transmitted by a router (e.g. cell site element 18) using any required IP forwarding techniques to get the packet to the back-haul PPP interface. The PPP-layer compression protocols (cUDP, PPPmux) may then be used on this PPP interface to reduce the UDP/IP headers to two-three bytes and aggregate multiple packets into one larger PPPmux packet. The router (e.g. aggregation node 22) on the other end of the backhaul interface may de-multiplex and de-compress the data in order to extract the original UDP/IP packet, which may then be routed to the receiving interface using any selected IP forwarding techniques. Based on the IP destination address, the packet is delivered to the mapping module. The mapping module may perform the reverse mapping (as described above) delivering a reconstituted HDLC frame. This HDLC frame may then be transmitted on the interface to the BTS/BSC.

In accordance with one embodiment of the present invention (the first option), the HDLC/BCN header fields may be mapped to the UDP/IP header fields of a UDP packet. The UDP packet is sent to a destination address that corresponds to a cross-connect ID (CCI) (destination interface) that is assigned a loop-back IP address. It may also be appropriate that source-based routing be disabled on the input/output cell site router and aggregation node interfaces in cases where the source IP address is used for the mapping.

Once a selected mapping function separates the HDLC payload into an M-byte header and data, this header may be used to fill the UDP/IP header fields. The remainder of the HDLC payload may be copied to the payload field of the UDP packet. Because the TOS/DSCP fields are used for QoS classification, the UDP source/destination port and IP source address field can be used for mapping. Thus, a maximum value of M may be eight bytes for a first option. The M bytes of the HDLC/BCN header may be mapped to the UDP/IP fields in the following order (assuming MSB byte order): UDP source port, UDP destination port, IP source address.

With respect to the first option, a destination IP address may be associated with each source/destination interface and, thus, explicit CCI provisioning is not required. The destination IP addresses may be provisioned as "loop-back" interfaces of the corresponding HDLC interfaces (although they do not necessarily carry native IP traffic). Either static routes or a routing protocol can be used to distribute the routing information to cell site element 18 and aggregation node 22.

The fields of the HDLC payload (i.e. minus the flag, CRC segments) may be identified as follows: Input HDLC/BCN packet=ADDR|CTRL|FLOW|COS|SEQ|PC|Misc|PT|Payload|. These fields may be defined as follows: ADDR: 8-bit HDLC address (one/two values per CCI/SOURCE link), CTRL: 8-bit HDLC control (typically one value per eel/source link), FLOW: 24-bit BCN flow/call ID, COS: 4-bit BCN class-of-service (typically two values per flow), SEQ: 4-bit sequence number (monotonically increases for each packet in flow) PC: 8-bit power control (random value), Misc: 4-bit miscellaneous field (random value), PT: 4-bit payload type (4-5 values corresponding to voice/date frame rate), and Payload: voice/data sample data (O-N bytes depending on PT).

The compression context and CID may be established based on the first five and one half bytes (ADDR-COS) plus the PT nibble for a total of M=6 bytes (e.g. with a hash function). The SEQ number may be transmitted with every compressed packet, but may be swapped with the PT nibble in order to save bandwidth (i.e. by changing the nibbles and then removing the 6-byte HDLC/BCN header treating the rest as the payload). The total number of CIDs per flow/call ID may be 6-bits, allowing for a total of 10-bits to identify the call and CCI. For the first option, the 6-byte context/header information may be mapped to a UDP/IP packet whose headers are then "hashed" to a 16 or 8-bit cUDP CID.

Figure 2:
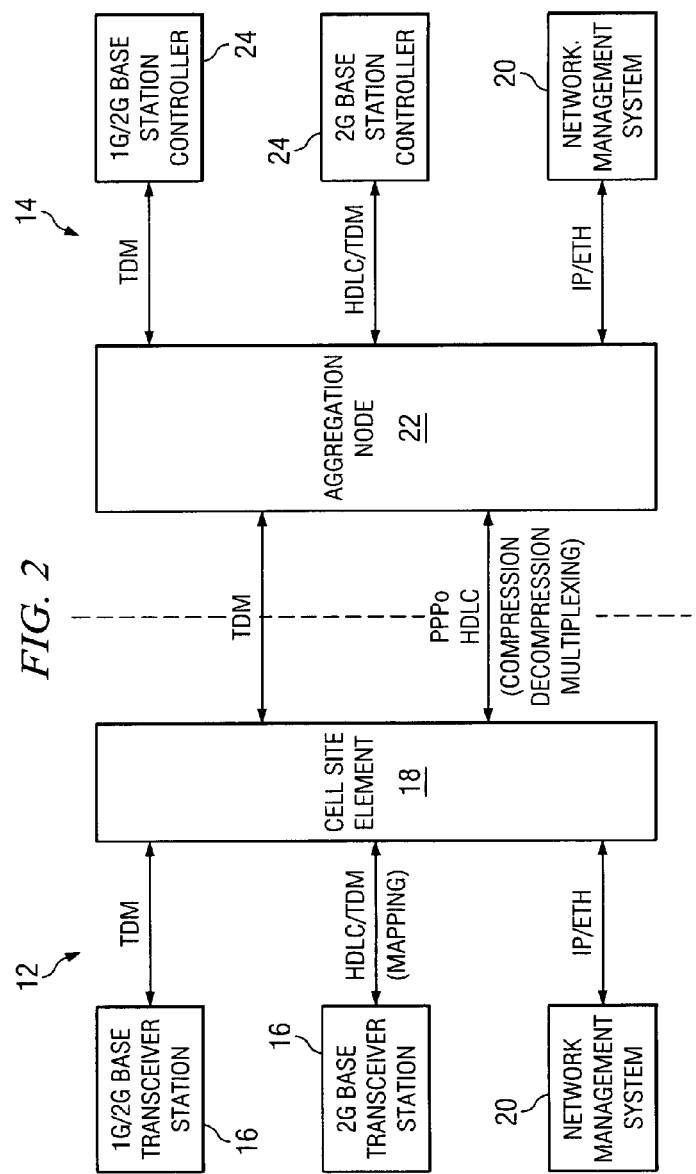
FIG. 2 is a simplified block diagram of an example traffic flow in the communication system.

FIG. 2 shows an example traffic flow in communications system 10. For discussion purposes only, a specific layer two-based approach is presented. However, other types of layer one, two, or three-based protocols may be used herein with equal effectiveness. The transport of the sub-frames over the packet back-haul can be layer two-based architecture, but also could be any other suitable layer based implementation such as a layer-four based implementation. The layer two-based approach is a compression scheme that allows existing packet based backhaul transport protocols to be integrated with (and efficiently carried over) an IP-based backhaul transport mechanism. In a simplest case, offered for purposes of example only, the source link (e.g. T1) contains GSM frames containing voice, data, control, or O&M traffic.

FIG. 2 also illustrates the designated locations for performing one or more of the operations of communication system 10. These illustrations further clarify the succession of tasks that are being performed by the elements of the architecture. For example, at the 'HDLC/TDM' interface (just before cell site element 18), a mapping function may be executed. The mapping function may convert the packet flow into IP such that an IP stack can accommodate the received data. In another example, the 'PPPoHDLC' interface is the designated location for compression, decompression, and multiplexing to occur. These operations may be performed before the packet flow is delivered to aggregation node 22. Accordingly, corresponding mapping and demapping modules, as well as compression, decompression, multiplexing, and demultiplexing components, devices, modules, hardware, or software may be positioned in any appropriate manner in order to facilitate the execution of these various tasks.

It is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Each aggregation node 22 or cell site element 18 may include a framer, a time-switch element, a forwarder, and a routing functionality element that is operable to direct packets in the network. Each of aggregation node 22 and cell site element 18 may perform similar compression and data management techniques. Each of these elements may also include any suitable hardware, software, object, or element operable to execute one or more of their functionalities (e.g. compression, decompression, multiplexing, demultiplexing, etc.). Additionally, such elements may be inclusive of suitable algorithms that operate to distribute data properly in a communications environment. For example, appropriate algorithms and software may be used in order to identify the type of signal (or information associated with the signal or link) being communicated between base transceiver station 18 and base station controller 24.

Current mobile and RAN products may be focused on transport of traffic from the cell-site, where the BTS is generally located, to the CO, where the BSC is generally located. In general, only IP routing (Layer-three) solutions are provided for this space. However, the data transport requirements for much of the traffic in a 2G/3G RAN is point-to-point (BSC-to-BTS). Such IP solutions add significant amounts of overhead and cost in order to be as efficient as comparable networks. In addition, these solutions rely on compliance with pre-standards architecture.

HDLCmux represents a compression scheme that takes the payload of HDLC-based packet back-haul links (i.e. T-1) at cell site router 18 and multiplexes one or more payloads together into a PPP packet (using PPPmux) that is then forwarded down another T-1 that is executing PPP. There are several compression options available depending on a number of suitable factors. One option is standard compressed UDP (cUDP). In a 2G environment, the HDLC traffic may be given higher priority over other traffic sources that are presumed to be non real-time management/control traffic.

In a simplest case of the compression algorithm, the source link (e.g. T-1) contains HDLC frames. Cell site router 18 may ignore inter-frame fill, strip off the HDLC header/tail (flag, CRC), pass the payload (including HDLC address/control) to the HDLCmux stack for compression and then PPP multiplexing. The PPPmux frames may be transported over the back-haul network using a PPP stack and may be mixed with other frames (e.g. IP traffic that is PPP-multiplexed). The receiving HDLCmux stack may deliver individual HDLC payloads that are then transported over the destination link by re-inserting the inter-frame fill and HDLC header/tail.

In operation of an example embodiment, the HDLCmux compression operation can be broken down into twelve phases:

1) Application compression: Delineation of the HDLC payload from the HDLC framing/control (fill, flag, CRC, address, control) on a source link. Each frame from the stream may be assigned a destination link and given a CCI. A vendor specific mapping function may be is applied to the remainder of the payload in order to map the M-byte frame header to a context ID (CID) value and to remove repetitive header information. With respect to a first option, the mapping may be accomplished by filling the UDP/IP headers with the HDLC payload.

2) Switching/routing: Based on the CCI of the frame, an output stream may be selected (e.g. an MLP bundle). For the first option, the mapping function may assign a destination IP address to the packet before being routed. This address may be used for routing to the appropriate output stream.

3) Layer Two Compression (First Option): The UDP/IP packets may arrive at the output interface and, based on cUDP size criteria, are compressed on a per flow basis. A cUDP CID may be selected for each unique combination of UDP source/destination port, IP source/destination address and TOS fields.

4) Mixing: PPPmux packets from HDLC sources may be given higher priority (default) than PPP traffic from IP and other sources. A special PPP ID (PID) may uniquely identify HDLC multiplexed packets in the case of one option, while the cUDP PID may identify HDLC multiplexed packets in the case of another option. Once mixed, the PPP packet may be set to the physical/virtual interface.

5) Multiplexing: PPP payloads (i.e. from cHDLC/BCN or cUDP) destined for the same output stream may be multiplexed into one larger PPPmux packet.

6) Transmission: PPP packets (PPPmux, IP, etc.) are sent on T-1 output link (e.g. the output link may be an MLP bundle (virtual interface)).

7) Reception: PPP packets on input T-1 link (termination of the output link) may be received.

8) Separation: PPP multiplexed packets on the input link are separated from other PPP packets and given to the HDLCmux stack for processing.

9) De-multiplexing: PPP multiplexed packets may be split into one or more payloads.

10) Layer-two De-compression (First option): The cUDP packets from the input interface are decompressed to UDP/IP packets based on their CID.

11) Switching/routing: Based on the IP destination address (First option), the packet is sent to a particular destination link (or loop-back address).

12) Application de-compression: The M-byte HDLC/BCN header may be recreated based on the CID field and vendor-specific mapping may be applied in order to re-create the original HDLC payload. The resulting HDLC frame is encapsulated by HDLC flags and transmitted on the destination link. This effectively replicates the HDLC stream that was transmitted on the source link.

Figure 3:
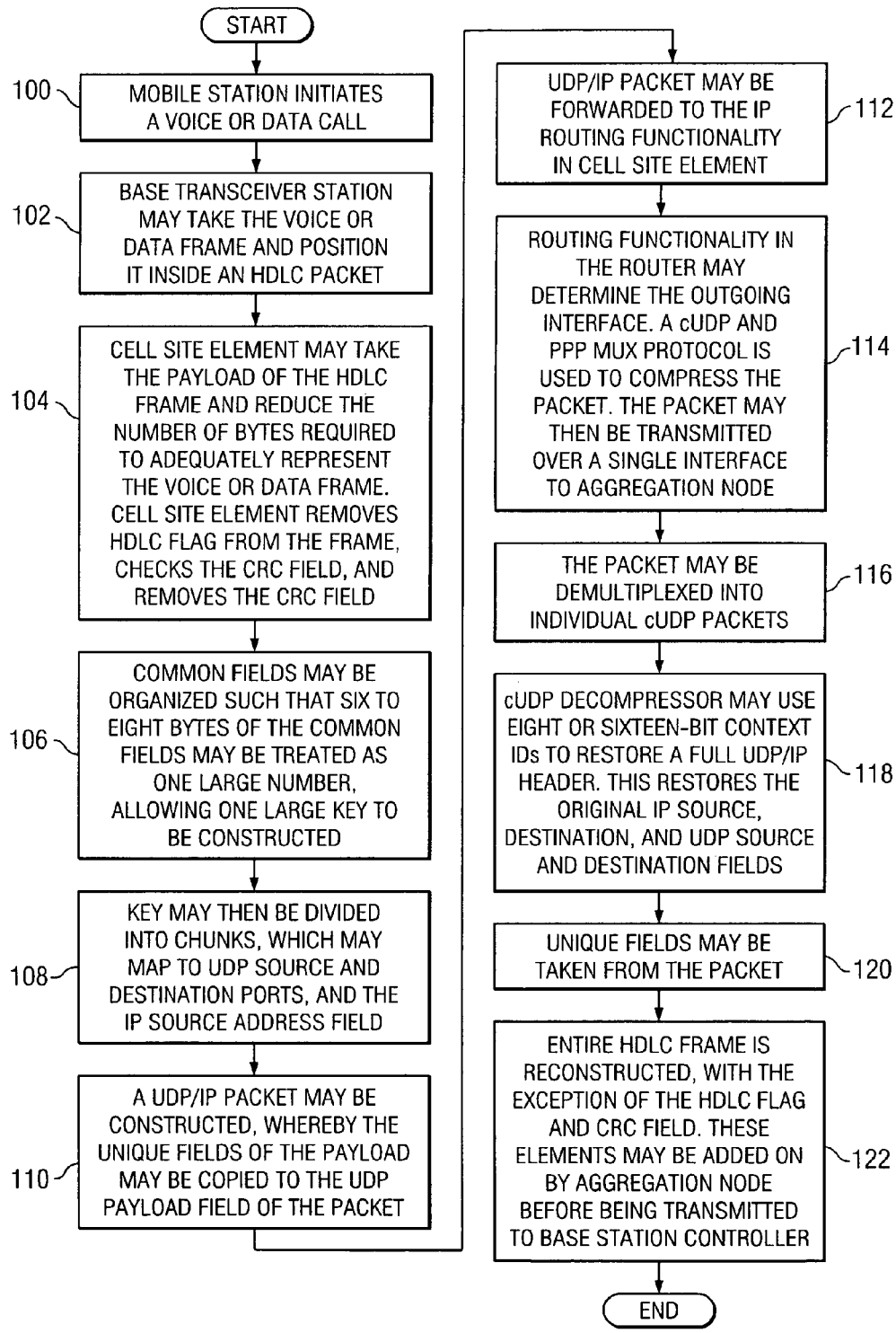
FIG. 3 is a simplified flowchart illustrating a series of example steps associated with the communication system.

FIG. 3 is a simplified flowchart illustrating a series of example steps associated with a method for compressing voice data in a communications environment. For purposes of clarity, it may be noted that the flowchart of FIG. 3 may be segmented in the following manner. Steps 102, 104, 106, 108, and 110 may be viewed as representing the mapping functionality (described above) to be performed by communication system 10. Step 112 generally represents a routing functionality, whereby a packet flow may be handed to a corresponding IP stack. Compression operations may be executed at step 114. Additionally, demultiplexing and decompression operations may be executed at steps 116 and 118 respectively.

The method may begin at step 100, where mobile station 13 or MSC 25 may initiate a call or a voice or data frame. This may be translated over the air via a suitable interface. This voice frame, which may be part of an initiated communication session, may be received at base transceiver station 16. At step 102, base transceiver station 16 may take the voice frame and position it inside an HDLC packet, the HDLC packet being transmitted to a T1 or E1 line connected thereto. Cell site element 18 may take the payload of the HDLC frame (e.g. everything between the flag marker and the CRC element) and reduce the number of bytes required to adequately represent the voice or data frame at step 104. Thus, cell site element 18 may remove HDLC flags from the frame, check the CRC field, and then remove the CRC field.

Part of the compression algorithm may take the fields of the HDLC payloads: those that may be split into common (remains constant for the duration of a flow) and unique (changes with each packet or frame that is transmitted by base transceiver station 16) fields. The common fields may be organized such that six to eight bytes (in the example of Ipv4, whereby Ipv6 may be extended to six to twenty bytes) of the common fields may be treated as one large number, allowing one large key to be constructed at step 106. The key may then be divided into chunks, which may map to UDP source and destination ports, and the IP source address field at step 108. The keys are essentially are mapped to the source or routing information.

Communication system 10 may exploit a common feature of IP networks in that IP routing is generally destination-based. Thus, source address information is generally irrelevant, as is the UDP information. These facts are recognized in using the IP address space as a key for the compressor. Hence, cell site element 18 can take the common fields and map them to a key that gets mapped into the IP source address field, as well as the UDP source and destination fields.

Once these common fields are mapped, a UDP/IP packet may be constructed, whereby the unique fields of the payload may be copied to the UDP payload field of the packet at step 110. That UDP/IP packet may be forwarded to the IP routing functionality in cell site element 18 at step 112. The routing functionality of the router looks at the destination address included in the packet. The routing functionality in the router may determine the outgoing interface (e.g. a WAN link). In one embodiment, a cUDP and PPPmux protocol is used to compress the packet. The packet may then be transmitted over a single interface (e.g. a WAN link) and to aggregation node 22 at step 114.

The reverse process may then be implemented at aggregation node 22 in order to properly decompress the packet. Thus, the packet may be demultiplexed into individual cUDP packets at step 116. The cUDP decompressor may use an eight or a sixteen-bit context Id in order to locate the context for the particular stream such that a full UDP/IP header can be restored. This restores the original IP source, destination, and UDP source and destination fields as illustrated by step 118. This would essentially return the HDLC common payload fields from the cUDP context. Then, the unique fields may be taken from the packet at step 120. Thus, the entire HDLC frame is reconstructed, with the exception of the HDLC flag and CRC field. These elements may be added on by aggregation node 22 before being transmitted to base station controller 24 at step 122.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal components.

In addition, although the preceding description offers a compression protocol to be implemented with particular devices (e.g. aggregation node 22 and cell site element 18), the compression protocol provided may be embodied in a fabricated module that is designed specifically for effectuating the compression techniques as provided above. Moreover, such a module may be compatible with any appropriate protocol other than the described platforms, which were offered for purposes of teaching and example only.

Additionally, although numerous example embodiments provided above reference voice data, communication system 10 may cooperate with any other type of data in which compression protocols are applicable. For example, normative or standard data, video data, and audio-visual data may benefit from the teachings of the present invention. Communication system 10 provides considerable adaptability in that it may be used in conjunction with any information that is sought to be compressed in a communications environment.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for compressing data, comprising:
  a cell site element associated with a base transceiver station and operable to receive a packet communicated by a mobile station and to extract a high-level data link control (HDLC) payload from the packet, wherein the cell site element is further operable to perform a compression process on the HDLC payload in order to reduce a number of bytes associated with the packet, the cell site element being further operable to build a key that maps the HDLC payload associated with the packet to the key, the key being broken into segments that are positioned into a source internet protocol (IP) address field, a user datagram protocol (UDP) source port field, and a UDP destination port field of a UDP packet, the UDP packet being sent to a routing functionality of the cell site element such that it may be directed to a next destination.

2. The apparatus of claim 1, wherein the cell site element is operable to construct the UDP packet, and wherein remaining fields of the HDLC payload may be copied and positioned into a payload field of the UDP packet.

3. The apparatus of claim 1, further comprising:
  an aggregation node associated with a base station controller and operable to receive a point to point protocol (PPP) over HDLC packet that corresponds to the UDP packet from the cell site element.

4. The apparatus of claim 1, wherein the routing functionality receives the UDP packet and selects an outgoing interface to direct the packet, the outgoing interface operable to add a layer-two encapsulation and to perform a layer-two compression operation on the UDP packet.

5. The apparatus of claim 4, wherein the routing functionality implements a compressed UDP (cUDP) and a PPP multiplex protocol in order to compress the UDP packet.

6. The apparatus of claim 5, wherein the UDP packet may be demultiplexed into one or more individual cUDP packets.

7. The apparatus of claim 6, further comprising:
  a cUDP compressor operable to utilize one or more context IDs in order to resolve them into a UDP/IP header such that an original source IP field and original UDP source and destination fields may be restored for a reconstructed HDLC packet.

8. A method for compressing data, comprising:
  receiving a packet communicated by a mobile station;
  extracting a high-level data link control (HDLC) payload from the packet;
  performing a compression process on the HDLC payload in order to reduce a number of bytes associated with the packet;
  building a key that maps the HDLC payload associated with the packet to the key, the key being broken into segments that are positioned into a source internet protocol (IP) address field, a user datagram protocol (UDP) source port field, and a UDP destination port field of a UDP packet; and
  communicating the UDP packet to a routing functionality such that it may be directed to a next destination.

9. The method of claim 8, further comprising:
  constructing the UDP packet, wherein remaining fields of the HDLC payload may be copied and positioned into a payload field of the UDP packet.

10. The method of claim 8, further comprising:
  receiving a point to point protocol (PPP) over HDLC packet that corresponds to the UDP packet.

11. The method of claim 8, wherein the routing functionality receives the UDP packet and selects an outgoing interface to direct the packet, the outgoing interface operable to add a layer-two encapsulation and to perform a layer-two compression operation on the UDP packet.

12. The method of claim 8, further comprising:
implementing a compressed UDP (cUDP) and a PPP multiplex protocol in order to compress the UDP packet.

13. The method of claim 12, further comprising:
demultiplexing the UDP packet into one or more individual cUDP packets.

14. The method of claim 13, further comprising:
utilizing one or more context IDs in order to resolve them into a UDP/IP header such that an original source IP field and original UDP source and destination fields may be restored for a reconstructed HDLC packet.

15. A system for compressing data, comprising:
means for receiving a packet communicated by a mobile station;
means for extracting a high-level data link control (HDLC) payload from the packet;
means for performing a compression process on the HDLC payload in order to reduce a number of bytes associated with the packet;
means for building a key that maps the HDLC payload associated with the packet to the key, the key being broken into segments that are positioned into a source internet protocol (IP) address field, a user datagram protocol (UDP) source port field, and a UDP destination port field of a UDP packet; and
means for communicating the UDP packet to a routing functionality such that it may be directed to a next destination.

16. The system of claim 15, further comprising:
means for constructing the UDP packet, wherein remaining fields of the HDLC payload may be copied and positioned into a payload field of the UDP packet.

17. The system of claim 15, further comprising:
means for receiving a point to point protocol (PPP) over HDLC packet that corresponds to the UDP packet.

18. The system of claim 15, wherein the routing functionality receives the UDP packet and selects an outgoing interface to direct the packet, the outgoing interface operable to add a layer-two encapsulation and to perform a layer-two compression operation on the UDP packet.

19. The system of claim 15, further comprising:
means for implementing a compressed UDP (cUDP) and a PPP multiplex protocol in order to compress the UDP packet.

20. The system of claim 19, further comprising:
means for demultiplexing the UDP packet into one or more individual cUDP packets.

21. The system of claim 20, further comprising:
means for utilizing one or more context IDs in order to resolve them into a UDP/IP header such that an original source IP field and original UDP source and destination fields may be restored for a reconstructed HDLC packet.

* * * * *